US009017003B2

(12) United States Patent
Nims et al.

(10) Patent No.: US 9,017,003 B2
(45) Date of Patent: Apr. 28, 2015

(54) LOADING DEVICE

(75) Inventors: Charles E. Nims, Redford, MI (US); Arthur D. Dybowski, Oxford, MI (US)

(73) Assignee: AM General LLC, South Bend, IN (US)

( * ) Notice: Subject to any disclaimer, the term of this patent is extended or adjusted under 35 U.S.C. 154(b) by 838 days.

(21) Appl. No.: 13/031,868

(22) Filed: Feb. 22, 2011

(65) Prior Publication Data

US 2012/0045305 A1 Feb. 23, 2012

Related U.S. Application Data

(60) Provisional application No. 61/306,756, filed on Feb. 22, 2010.

(51) Int. Cl.

*B60P 1/04* (2006.01)
*A61G 3/02* (2006.01)
*A61G 3/08* (2006.01)

(52) U.S. Cl.

CPC ............ *A61G 3/0236* (2013.01); *A61G 3/0245* (2013.01); *A61G 3/0254* (2013.01); *A61G 3/0263* (2013.01); *A61G 3/0272* (2013.01); *A61G 3/0825* (2013.01); *A61G 3/0891* (2013.01)

(58) Field of Classification Search

USPC ......... 414/537, 538, 522, 469, 474, 476, 479, 414/477

See application file for complete search history.

(56) References Cited

U.S. PATENT DOCUMENTS

| | | | | |
|---|---|---|---|---|
| 1,208,260 | A | 12/1916 | Wood | |
| 1,296,207 | A * | 3/1919 | Myers | 414/522 |
| 2,387,082 | A | 10/1945 | Malling | |
| 2,786,590 | A * | 3/1957 | Edwards et al. | 414/477 |
| 3,485,400 | A * | 12/1969 | Pewthers | 414/477 |
| 3,651,623 | A * | 3/1972 | Harley | 56/15.5 |
| 4,655,671 | A * | 4/1987 | Pratt | 414/477 |
| 4,840,532 | A * | 6/1989 | Galbreath | 414/479 |
| 4,929,142 | A * | 5/1990 | Nespor | 414/563 |
| 5,249,910 | A * | 10/1993 | Ball | 414/538 |
| 5,556,249 | A * | 9/1996 | Heine | 414/500 |
| 5,829,945 | A * | 11/1998 | Stanley | 414/477 |
| 5,934,863 | A * | 8/1999 | Beck | 414/538 |
| 6,099,232 | A * | 8/2000 | Dixon et al. | 414/494 |
| 6,916,056 | B2 * | 7/2005 | Mitchell et al. | 296/20 |

(Continued)

FOREIGN PATENT DOCUMENTS

| | | | |
|---|---|---|---|
| CH | 610254 | A5 | 4/1979 |
| DE | 202009015121 | U1 | 2/2010 |

(Continued)

OTHER PUBLICATIONS

European Patent Office, International Search Report, Jun. 14, 2011, 4 pages.

(Continued)

*Primary Examiner* — Saul Rodriguez
*Assistant Examiner* — Glenn Myers
(74) *Attorney, Agent, or Firm* — Barnes & Thornburg LLP

(57) ABSTRACT

A loading device for incorporation into a vehicle, such as an ambulance, for loading and unloading a stretcher. The loading device has a retracted configuration and an extended configuration. The loading device being predisposed to the extended configuration. The loading device may include a hoist assembly to counteract the predisposition to the extended position and move the loading device to the retracted configuration.

15 Claims, 14 Drawing Sheets

(56) References Cited

U.S. PATENT DOCUMENTS

| | | | | |
|---|---|---|---|---|
| 7,188,880 | B1 | 3/2007 | Frieder et al. | |
| 7,192,239 | B2 * | 3/2007 | Marmur et al. | 414/478 |
| 7,354,236 | B1 * | 4/2008 | Springer | 414/538 |
| 8,215,893 | B2 * | 7/2012 | Simpson | 414/478 |
| 8,444,365 | B2 * | 5/2013 | Duell et al. | 414/494 |
| 2002/0114688 | A1 * | 8/2002 | Poindexter et al. | 414/477 |
| 2002/0164239 | A1 * | 11/2002 | Angermeier | 414/480 |
| 2004/0018076 | A1 | 1/2004 | Poindexter | |
| 2004/0179927 | A1 | 9/2004 | Georges | |
| 2004/0200695 | A1 * | 10/2004 | Armour | 198/414 |
| 2004/0202533 | A1 | 10/2004 | Haire | |
| 2007/0122259 | A1 * | 5/2007 | McGrath | 414/538 |
| 2009/0015027 | A1 * | 1/2009 | Lambarth et al. | 296/20 |
| 2009/0081015 | A1 * | 3/2009 | Hutchison | 414/522 |
| 2009/0263220 | A1 * | 10/2009 | Miller | 414/478 |
| 2011/0038698 | A1 * | 2/2011 | Li | 414/479 |

FOREIGN PATENT DOCUMENTS

| | | | |
|---|---|---|---|
| FR | 2830437 | A1 | 4/2003 |
| GB | 2286813 | A | 8/1995 |
| JP | 2000108757 | A | 4/2000 |
| WO | 2007092613 | A2 | 8/2007 |
| WO | 2008153991 | A1 | 12/2008 |
| WO | 2011054581 | A1 | 5/2011 |

OTHER PUBLICATIONS

Written Opinion of the International Searching Authority, Jun. 14, 2011, 5 pages.

Search Report, Spanish Patent Office, 5 pages, May 13, 2014, Spainish Application #201290065.

* cited by examiner

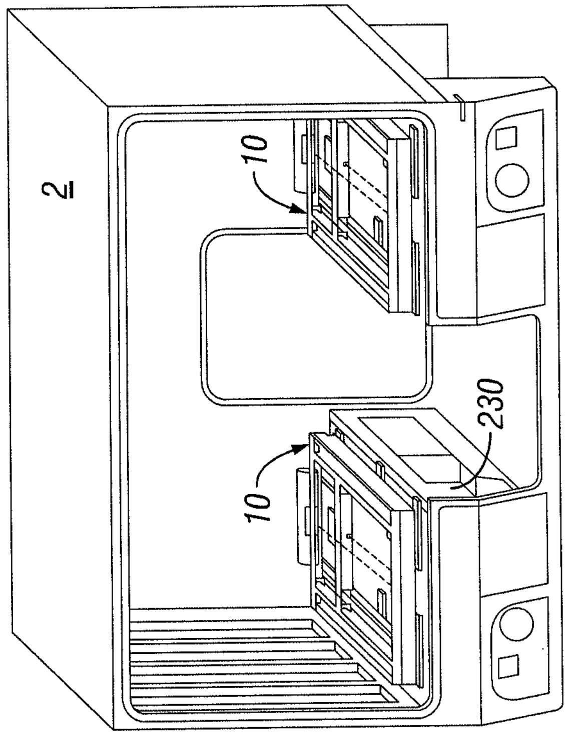
FIG. 15
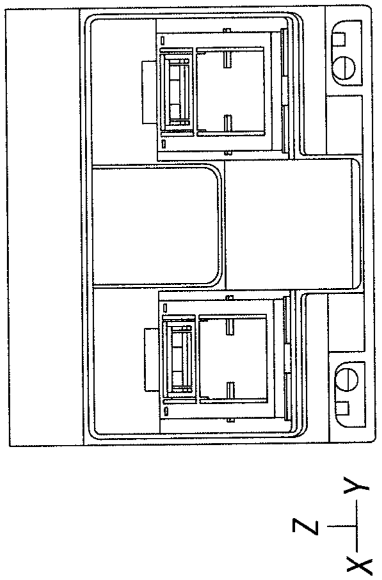
Rear View

LOADING DEVICE

CROSS REFERENCE TO RELATED APPLICATIONS

The present application claims priority to U.S. provisional patent application Ser. No. 61/306,756 filed on Feb. 22, 2010, which is herein incorporated by reference in its entirety.

BACKGROUND AND SUMMARY

The present invention relates generally to an apparatus for incorporation into a vehicle, such as an ambulance, for loading and unloading a stretcher. More particularly, the apparatus of the present invention is directed to a device having a retracted configuration and an extended configuration. The loading device is predisposed to the extended configuration. The loading device may include a hoist assembly to counteract the predisposition to the extended position and move the loading device to the retracted configuration.

The loading device of the present invention is designed to assist in loading an object, such as a stretcher, into a vehicle and unloading the object from the vehicle. For example, the present invention can be used to load and unload a field stretcher or pole litter, such as those referred to in the NATO specification for STANAG 3040. A common method of handling injured or infirmed patients has been to place the patient on a stretcher for transport. It may be burdensome for stretcher bearers to load and/or unload stretchers into or out of vehicles such as an ambulance, truck, tracked vehicle, specialty vehicle, aircraft or boat.

One aspect of the present invention is directed to a loading device for a vehicle, the loading device being operable between a retracted configuration and an extended configuration. The loading device of the present invention includes a base assembly configured for mounting within the vehicle. The base assembly includes a base frame having a head end and a foot end, and a pair of base tracks. The base tracks are spaced apart and substantially parallel, each base track including a rail disposed on an inner side of each base track and a roller disposed on an outer side of each track at the foot end.

The loading device also includes a hoist assembly pivotally mounted on the base frame. The hoist assembly includes a hoist motor, a gear box coupled to the hoist motor, a cable spool coupled to the gear box, and a hoist cable disposed about the cable spool. The hoist cable includes a first end attached to the cable spool.

The loading device further includes a trolley assembly positioned on the base frame and configured to move linearly relative to the base frame. The trolley assembly includes a trolley frame having a plurality of rollers mounted on the trolley frame and configured to cooperate with the rails of the base tracks. The trolley assembly also includes a pair of load arms pivotally mounted on the trolley frame. The trolley assembly also includes a trolley balancer assembly mounted to the load arms, the trolley balancer assembly including a trolley balancer cable having a first end attached to the trolley balancer assembly and a second end attached to the foot end of the base frame. The trolley balancer assembly is biased to move the trolley assembly toward the foot end of the base frame.

The loading device further includes a tipping assembly positioned on and configured to move linearly relative to the base assembly. The tipping assembly is configured to cooperate with the trolley assembly and includes a tipping frame having a head end and a foot end. The tipping frame includes a pair of tipping track assemblies, the tipping track assemblies being spaced apart and substantially parallel. Each tipping track assembly includes an upper tipping track and a lower tipping track, wherein the tipping assembly in cooperation with the trolley assembly is biased to move toward the foot end of the base frame. The tipping assembly also includes an extension balancer assembly attached to the foot end of the tipping frame, the extension balancer assembly including an extension balancer cable having a first end attached to the extension balancer assembly.

The loading device also includes an extension assembly positioned on the tipping assembly and configured to move linearly relative to the tipping assembly. The extension assembly includes an extension frame having a head end and a foot end, and includes a pair of extension track assemblies. The extension track assemblies are spaced apart and substantially parallel and each extension track assembly including an upper track and a lower track. The lower extension tracks are configured to cooperate with upper tipping tracks. A second end of the extension balancer cable is attached to the foot end of the extension frame thereby biasing the extension assembly to move in a direction of the foot end of the tipping assembly.

A second end of the hoist cable is attached to the head end of the extension frame. The bias of the trolley assembly, the tipping assembly and the extension assembly predisposes the loading device to the extended configuration. The hoist assembly is configured to wind the hoist cable about the cable spool, such that the hoist assembly is capable of overcoming the bias of the trolley assembly, the tipping assembly, and the extension assembly to place the loading device in the retracted configuration.

Another aspect of the present invention is directed to a loading device for a vehicle, the loading device being operable between a retracted configuration and an extended configuration. The loading device includes a base configured for mounting within the vehicle, the base having a head end and a foot end. The loading device also includes a tipping assembly positioned on the base and configured to travel linearly relative to the base and configured to be substantially aligned with the base when the loading device is in the retracted configuration and positioned at an angle relative to the base when the loading device is in the extended configuration.

BRIEF DESCRIPTION OF THE DRAWINGS

The present invention will be described hereafter with reference to the attached drawings which are given as non-limiting examples only, in which:

FIGS. 13A-13C are perspective views of the loading and unloading device of FIG. 1 showing views of the device in different configurations, wherein FIG. 13A shows the device in a retraced configuration, FIG. 13B shows the device in a tipped configuration, and FIG. 13C shows the device in a partially extended configuration;

FIG. 15 is a perspective view showing loading and unloading devices of the present invention mounted within a vehicle.

DETAILED DESCRIPTION

Figure 1:
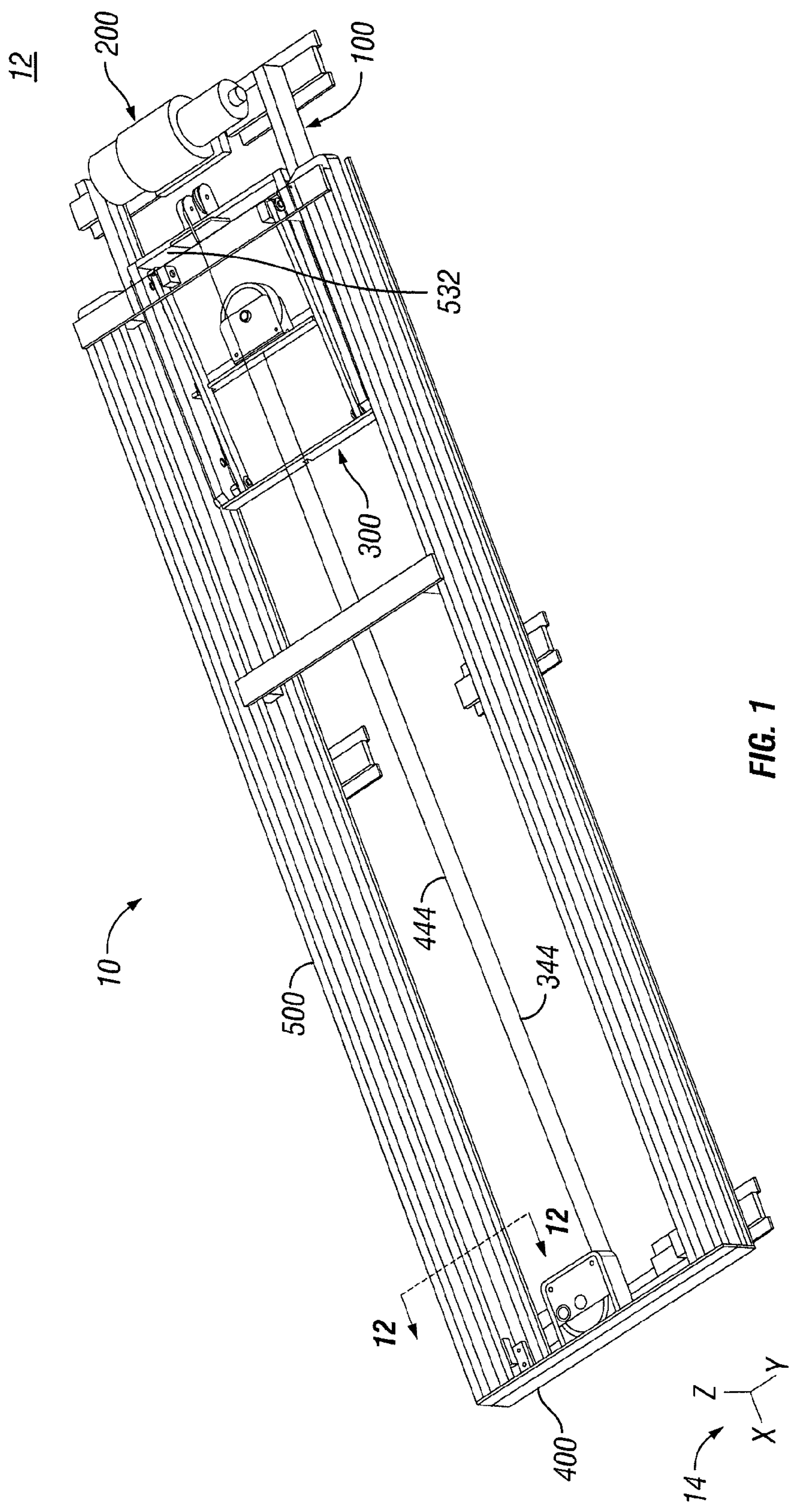
FIG. 1 is a perspective view of a loading and unloading device according to one embodiment of the present invention.
Figure 2:
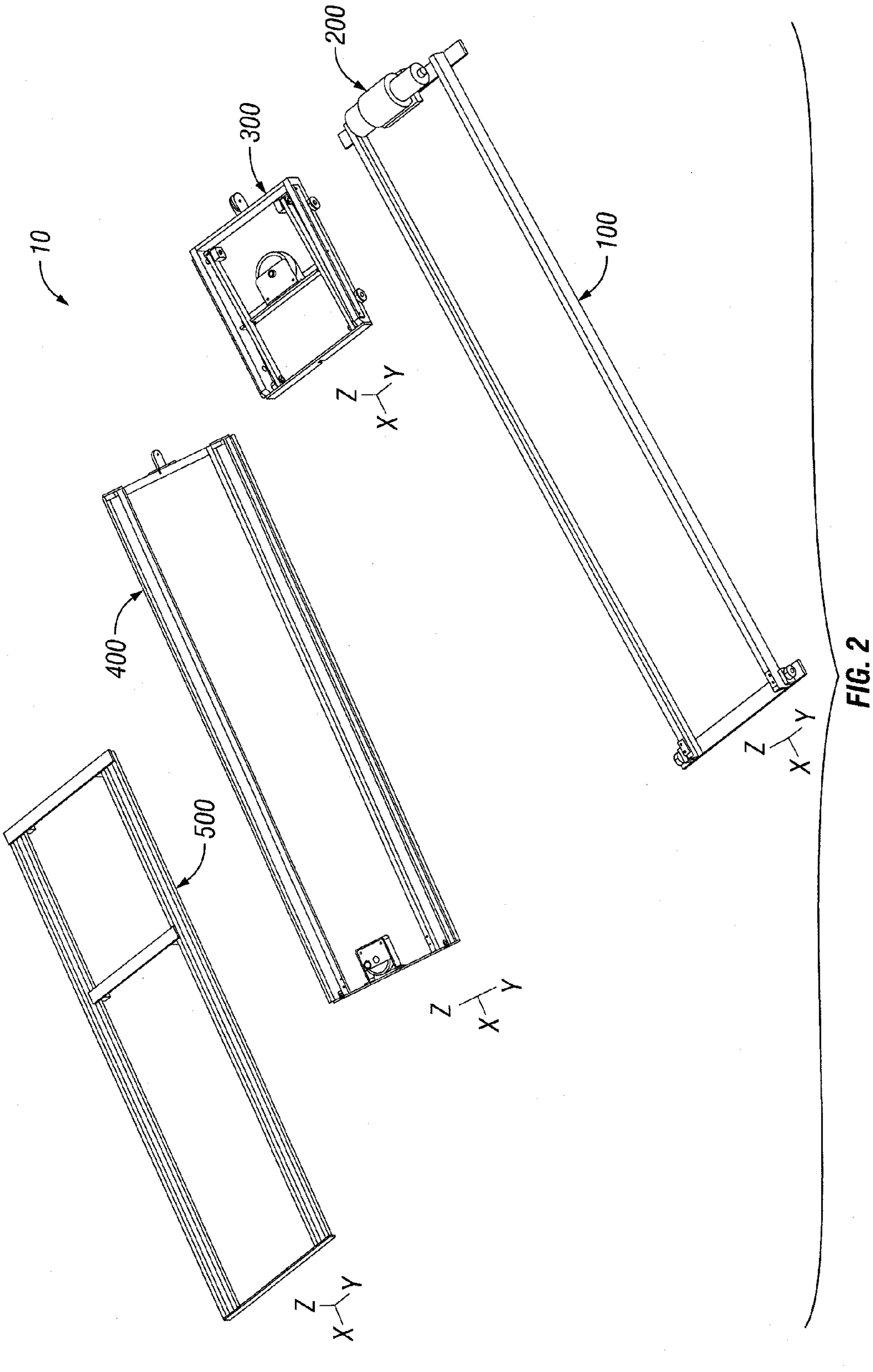
FIG. 2 is an exploded perspective view of the loading and unloading device of FIG. 1.

The present invention is directed to a loading device 10 for loading and unloading a stretcher, bearing a patient, into and/or out of a vehicle such as an ambulance. Referring to FIGS. 1 and 2, the loading device 10 according to one embodiment of the present invention includes a head end 12, a foot end 14 and a base assembly 100 configured for mounting in a vehicle. The device 10 further includes a hoist assembly 200 mounted on the base assembly 100. A trolley assembly 300 is provided and is configured to travel along the base assembly 100. The trolley assembly 300 is biased to travel relative to the base towards the foot end 14 of the loading device 10. The trolley assembly 300 is configured to engage a tipping assembly 400 thereby also biasing the tipping assembly to travel relative to the base 100 towards the foot end 14 of the loading device 10. The tipping assembly 400 is configured to angle downward relative to the base 100 when the loading device 10 is in an extended configuration. The loading device 10 of the present disclosure also includes an extension assembly 500 attached to the tilting assembly 400 and biased to travel in the direction of the foot end 14 of the loading device 10. After a stretcher has been loaded onto the extension assembly 500, the hoist assembly is configured to overcome the bias of the trolley assembly 300 and the extension assembly, thereby drawing the extension assembly 500 and the tilting assembly 400 into the vehicle in a retracted configuration.

Figure 3:
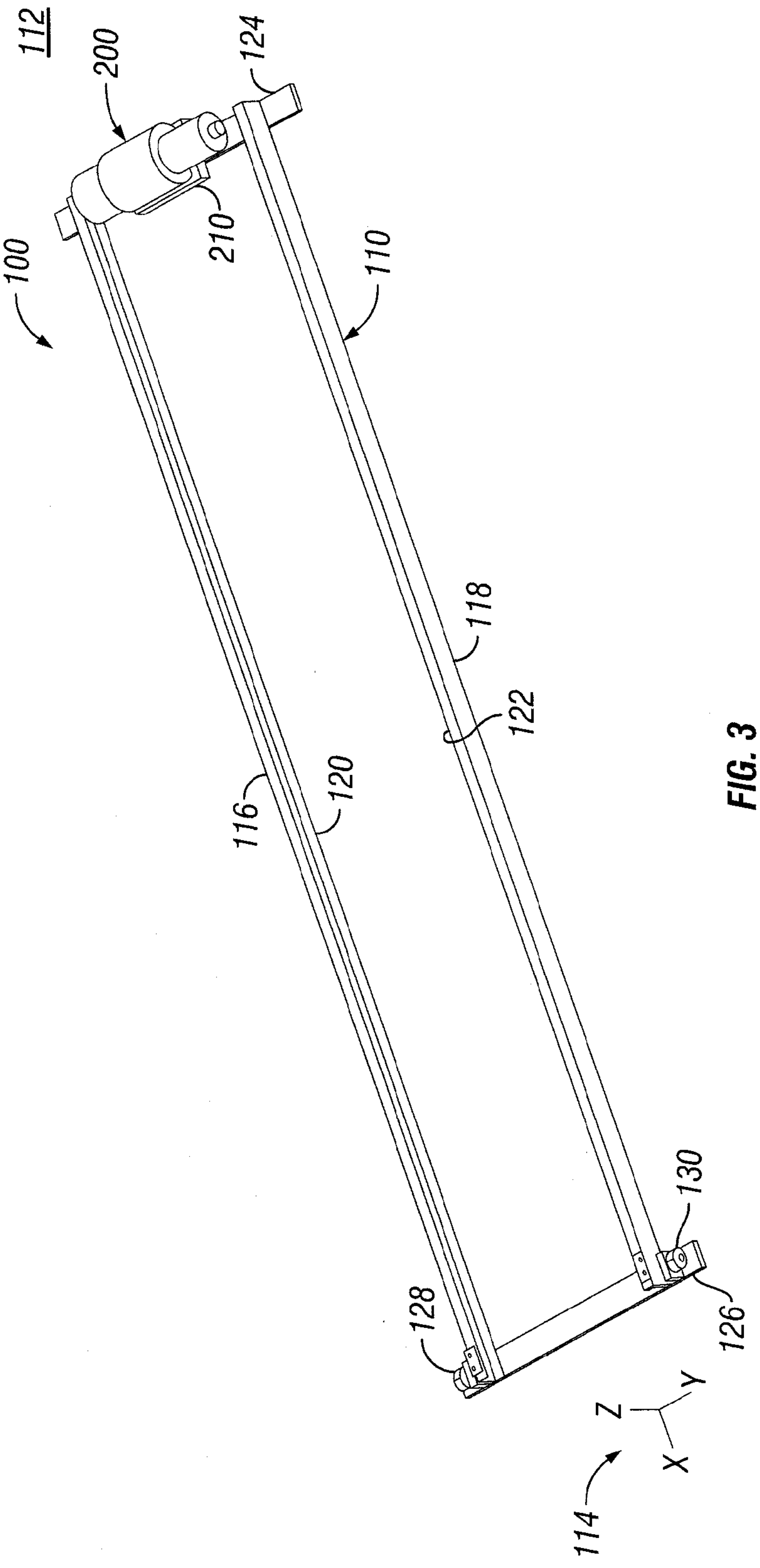
FIG. 3 is a perspective view showing the base assembly and the hoist assembly of the loading and unloading device of FIG. 1.

Referring to FIG. 3, the base assembly 100 is configured with a head end 112 and a foot end 114, corresponding to the head end 12 and foot end 14 of the loading device 10. The base assembly 100 includes a base frame 110 including a pair of base tracks 116, 118 spaced apart and substantially parallel. Each track 116, 118 includes a rail 120, 122 disposed on an inner side of each track 116, 118. A head-end base cross member 124 and a foot-end base cross member 126 are provided substantially perpendicular to and connecting base tracks 116, 118. Rollers 128, 130 are disposed on an outer side of each track 116, 118 at the foot end 112 of the base frame 110. A mount 210 for the hoist assembly 200 is provided on the head-end cross member 124.

Figure 4:
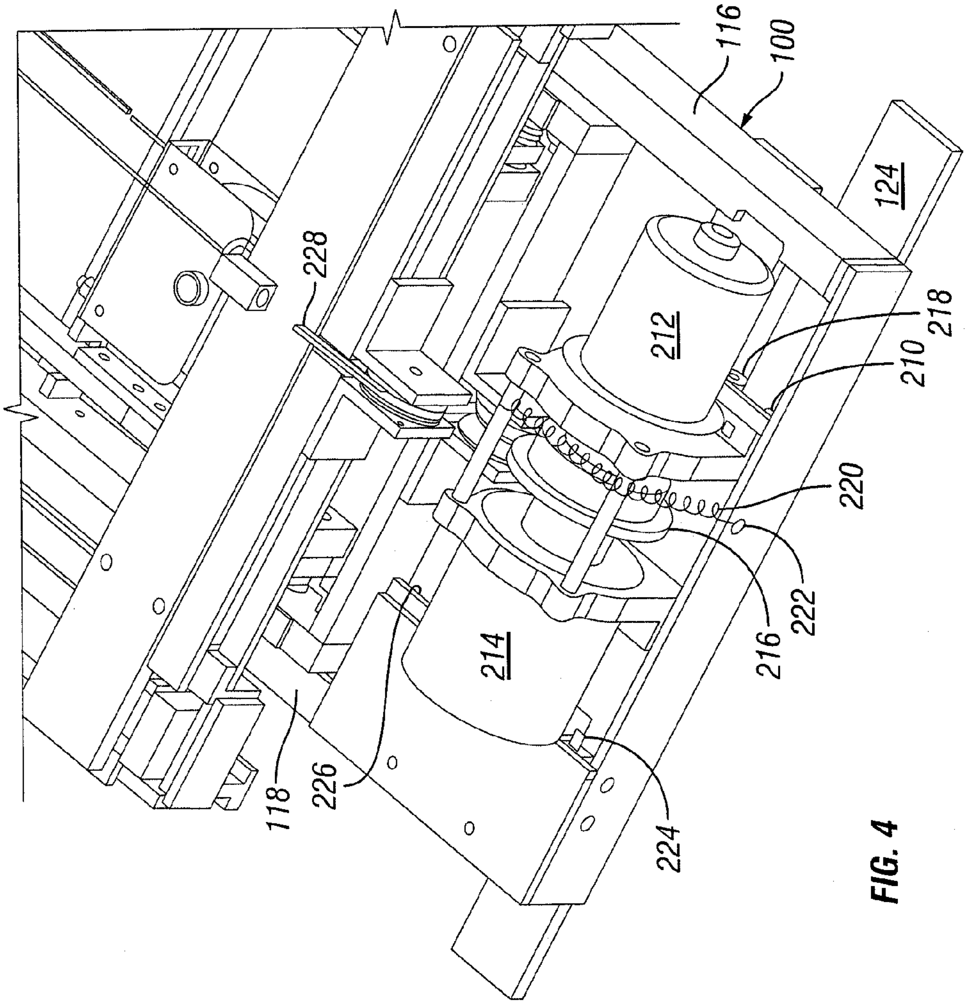
FIG. 4 is a detailed perspective view showing the hoist assembly mounted to the base assembly of the loading and unloading device of FIG. 1.
Figure 5:
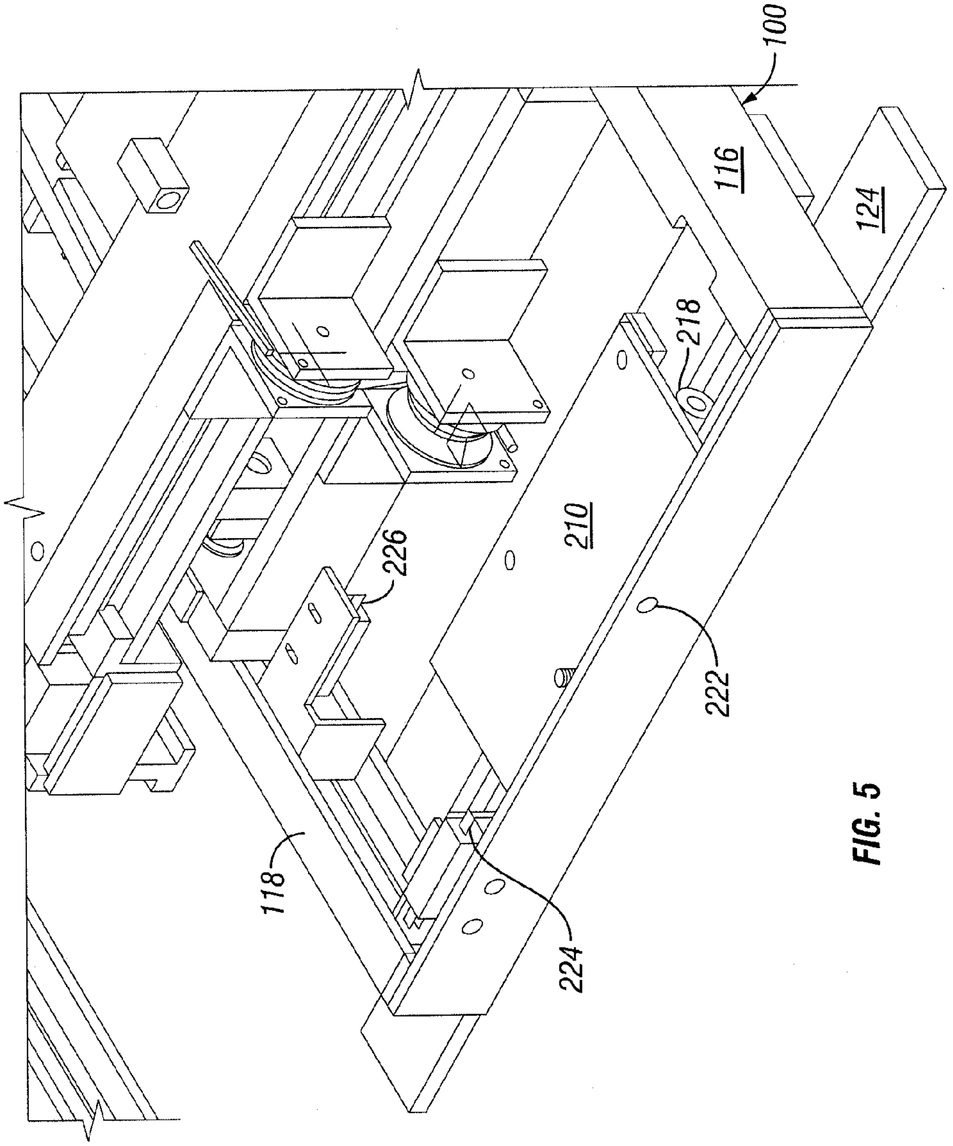
FIG. 5 is a detailed perspective view with the hoist assembly removed from FIG. 4 showing the pivotal hoist assembly mount.

The hoist assembly 200 includes a motor 212, gear box 214, and cable spool 216. Referring to FIGS. 4 and 5, the hoist assembly 200 is attached to the hoist assembly mount 210, which is pivotally coupled to the head-end cross member 124 at a pivot 218 and disposed between base tracks 116, 118. The hoist assembly mount 210 is configured to allow the hoist assembly 200 to tilt back and forth. An extension spring 220 is attached to the front of the motor 212 and connected to the head end 112 of the base assembly 100 at connection 222. The extension spring 220 is biased so as to cause the hoist assembly mount 210 to tilt downward at the head end 112. Hoist assembly 200 also includes directional switches, including a hoist pivot shut off switch 224 and a trolley return shut off switch 226. A hoist cable 228 is wound about cable spool 216.

Figure 6:
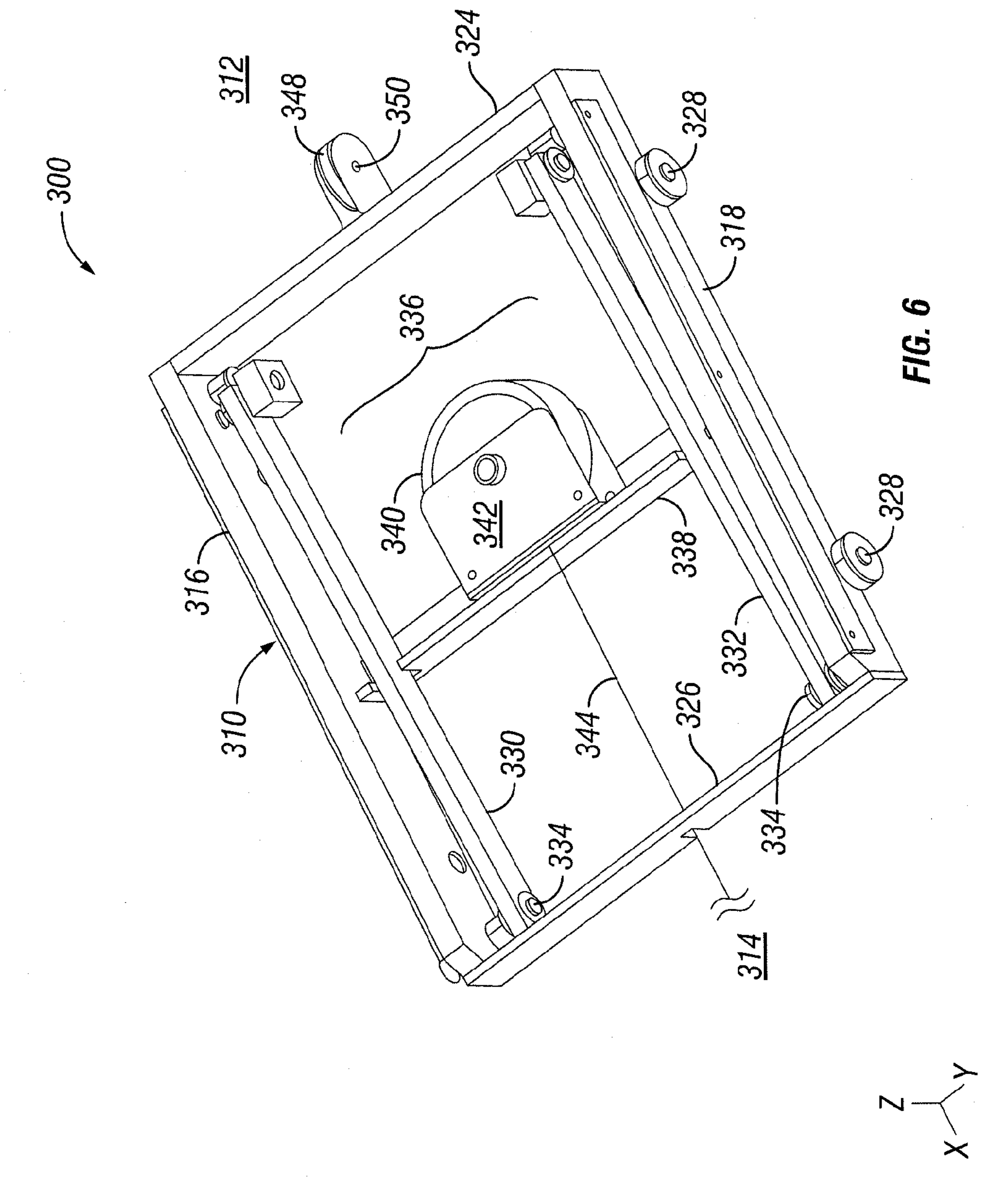
FIG. 6 is a perspective view showing the trolley assembly of the loading and unloading device of FIG. 1.

A trolley assembly 300 is provided to cooperate with the base assembly 100 and the tilting assembly 400. Referring to FIG. 6, the trolley assembly 300 includes a trolley frame 310 configured with a head end 312 and a foot end 314, corresponding to the head end 12 and foot end 14 of the loading device 10. The trolley assembly also includes a pair of trolley side frame members 316, 318 spaced apart and substantially parallel. A head-end trolley cross member 324 and a foot-end trolley cross member 326 are provided substantially perpendicular to and connecting trolley side frame members 316, 318. Trolley rollers 328 are provided on the outer sides of the trolley side frame members 316, 318. The trolley rollers 328 are configured to cooperate with the rails 120, 122 in the base tracks 116, 118 allowing the trolley assembly 300 to travel linearly back and forth relative to the base assembly 100.

Figure 8:
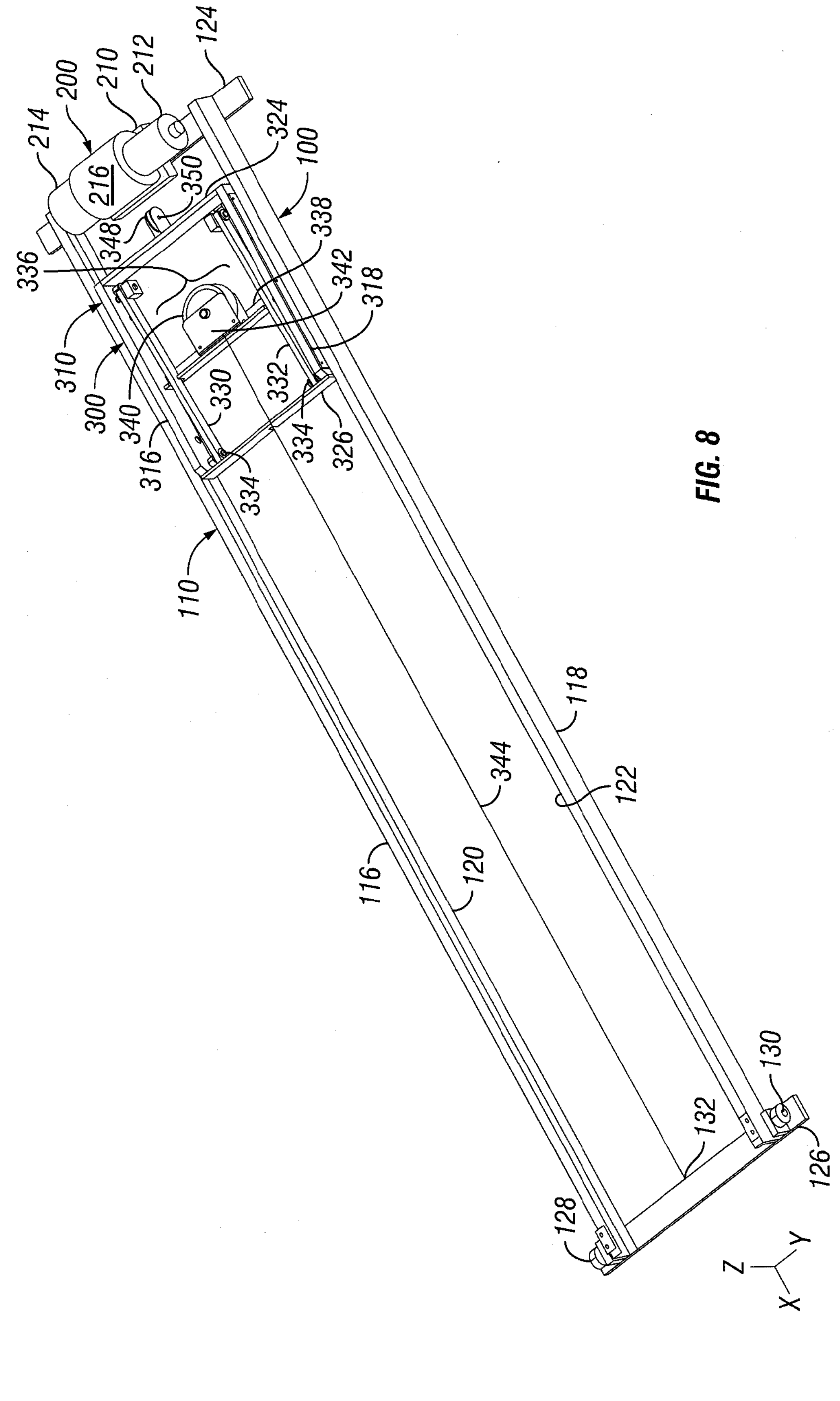
FIG. 8 is a perspective view of the trolley assembly of FIG. 6 positioned on the base assembly of FIG. 3.

Trolley assembly 300 further includes a pair of load bars 330, 332 pivotally connected to the inner sides of the trolley side frame members 316, 318 at the foot end by pins 334. A trolley balancer assembly 336 is mounted to the load bars 330, 332 by intermediate cross member 338 and positioned between the trolley head-end cross member 324 and the trolley foot-end cross member 326. The trolley balancer assembly 336 includes a spool 340 mounted in a bracket 342, the spool being configured to receive a trolley balancing cable 344. One end of the trolley balancing cable 344 is connected to the spool 340 and the other end is connected to the foot-end base cross member 126 at connection 132, as shown in FIG. 8. The spool 340 is biased, such as by a torsion spring, wound leaf spring, or other suitable means, such that the spool 340 is predisposed to wind the trolley balancing cable 344 about the spool 340, thereby configured to provide a tension force in the trolley balancing cable 344 which draws the trolley assembly 300 towards the foot end 114 of the base assembly 100.

Figure 7:
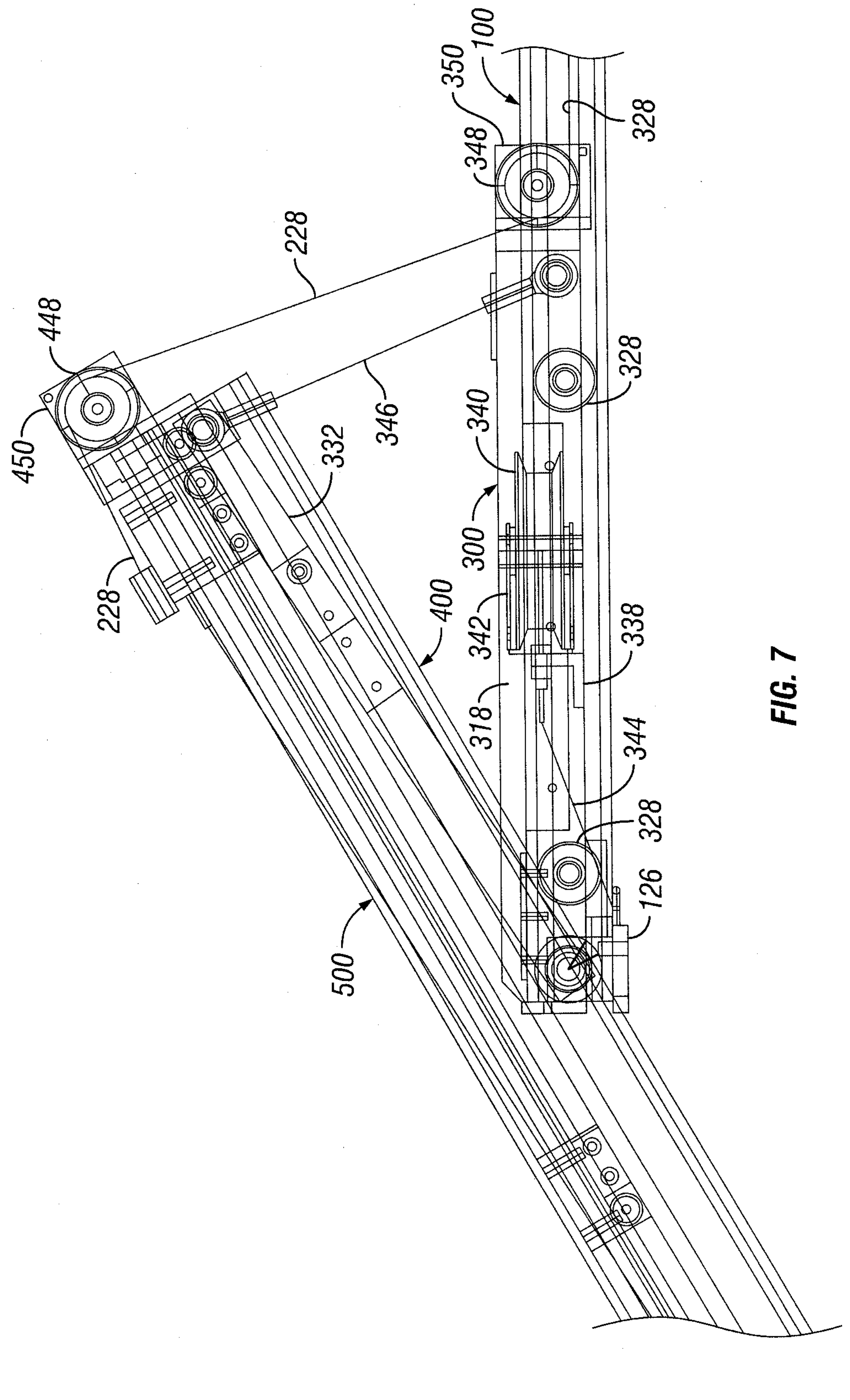
FIG. 7 is a side view of the trolley assembly of FIG. 6 showing the trolley assembly and the tipping assembly in the tipped configuration.

Load bars 330, 332 are configured to pivot upwardly away from the trolley frame 310 under the tension force of the trolley balancer 336 when the trolley assembly is at the foot end 114 of the base frame 110, as shown in FIG. 7. The angular travel of the load bars 330, 332 relative to the trolley side frame members 316, 318 is limited by retention cables 346 connected to the head end of the load bar and to the trolley frame 310. In an exemplary embodiment of the present invention, retention cables 346 are configured to limit the load bars 330, 332 to pivot to an angle of about 30 degrees relative to the trolley side frame members 316, 318.

Referring again to FIG. 6, the trolley assembly 300 further includes a hoist cable pulley 348 mounted on the head-end trolley cross member 324 within a pulley guide 350. The hoist cable pulley 348 is configured to receive the hoist cable 228 around its lower circumference, as shown in FIG. 7, and guide the hoist cable 228 upwardly to the tipping assembly 400.

Figure 9:
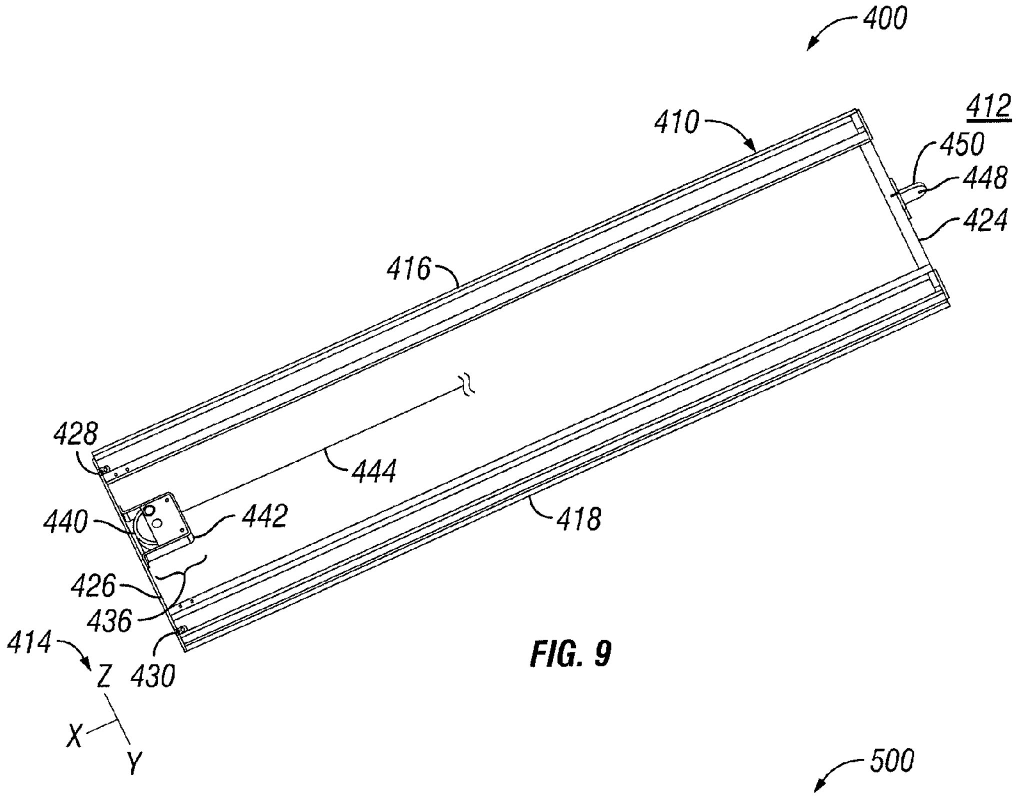
FIG. 9 is a perspective view of the tipping assembly of the loading and unloading device of FIG. 1.

Referring to FIG. 9, the tipping assembly 400 includes a tipping frame 410 having a head end 412 and a foot end 414, corresponding to the head end 12 and foot end 14 of the loading device 10, and a pair of tipping track assemblies 416, 418 spaced apart and substantially parallel. A head-end tipping cross member 424 and a foot-end tipping cross member 426 are provided substantially perpendicular to and connecting tipping track assemblies 416, 418. Each tipping track assembly 416, 418 includes an upper track 420*a*, 422*a*, formed on a top side of each track assembly 416, 418 and a lower track 420*b*, 422*b* formed on a lower side of each track assembly 416, 418. Rollers 428, 430 are mounted within the upper tracks 420*a*, 422*a* at the foot end 414. An extension balancer 436 is mounted on the foot-end tipping cross member 426. The extension balancer 436 includes a spool 440 mounted in a bracket 442, the spool configured to receive an extension balancing cable 444, as shown in FIG. 9. One end of the extension balancing cable 444 is attached to the spool 440; the other end is attached to the extension assembly 500 at connection 532 as shown in FIG. 1. Referring again to FIG. 9, the spool 440 of the extension balancer 436 is biased, such as by a torsion spring, wound leaf spring, or other suitable means, so as to wind the cable 444 about the spool 440, thereby configured to provide a tension force in the extension balancing cable 444 which draws the extension assembly 500 towards the foot end 414 of the tipping assembly 400. A hoist cable pulley 448 is mounted on the head-end tipping cross member 424 within a pulley guide 450. Hoist cable pulley 448 is configured to receive the hoist cable 228 from pulley 348 and guide the hoist cable 228 to the extension frame assembly 500 as shown in FIG. 7.

Figure 10:
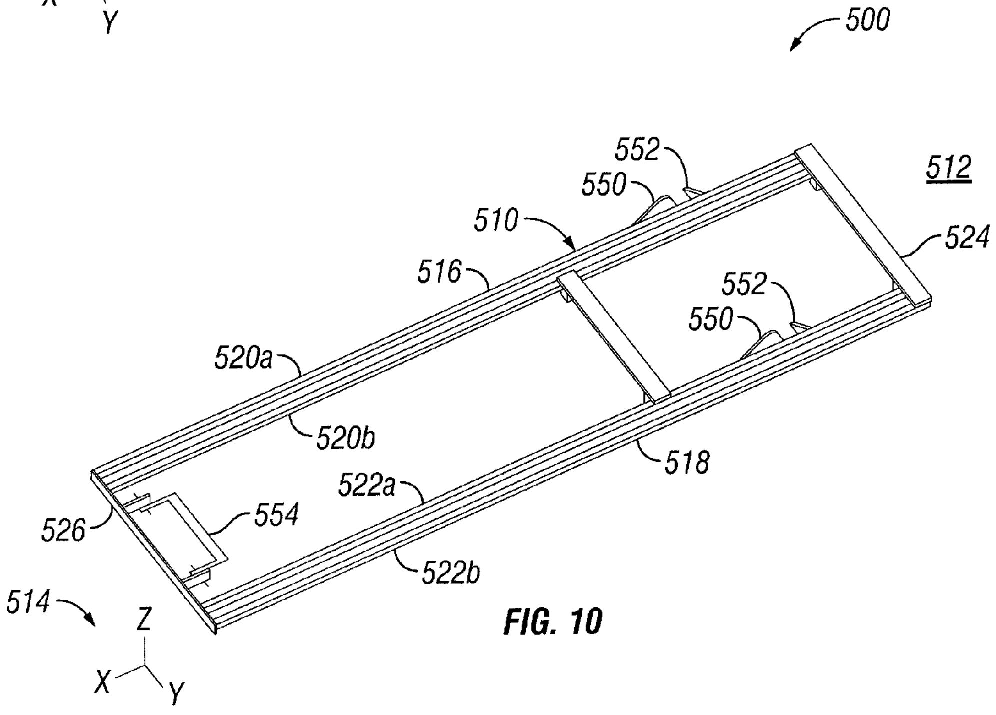
FIG. 10 is a perspective view of the extension assembly of the loading and unloading device of FIG. 1.

Referring to FIG. 10, the extension assembly 500 includes an extension frame 510 having a head end 512 and a foot end 514, corresponding to the head end 12 and foot end 14 of the loading device 10, a pair of extension track assemblies 516, 518, spaced apart and substantially parallel, and a head-end cross member 524 and a foot-end cross member 526 connecting the extension track assemblies 516, 518. Each extension track assembly 516, 518 includes an upper track 520*a*, 522*a* formed on a top side of each track assembly 516, 518 and a lower track 520*b*, 522*b* formed on a lower side of each track assembly 516, 518. The lower extension tracks 520*b*, 522*b* are configured to cooperate with the rollers 428, 430 mounted within the upper tracks 420*a*, 422*a* of the tipping track assemblies 416, 418. The upper extension tracks 520*a*, 522*a* are configured to cooperate with and retain the feet of a stretcher.

Figure 11:
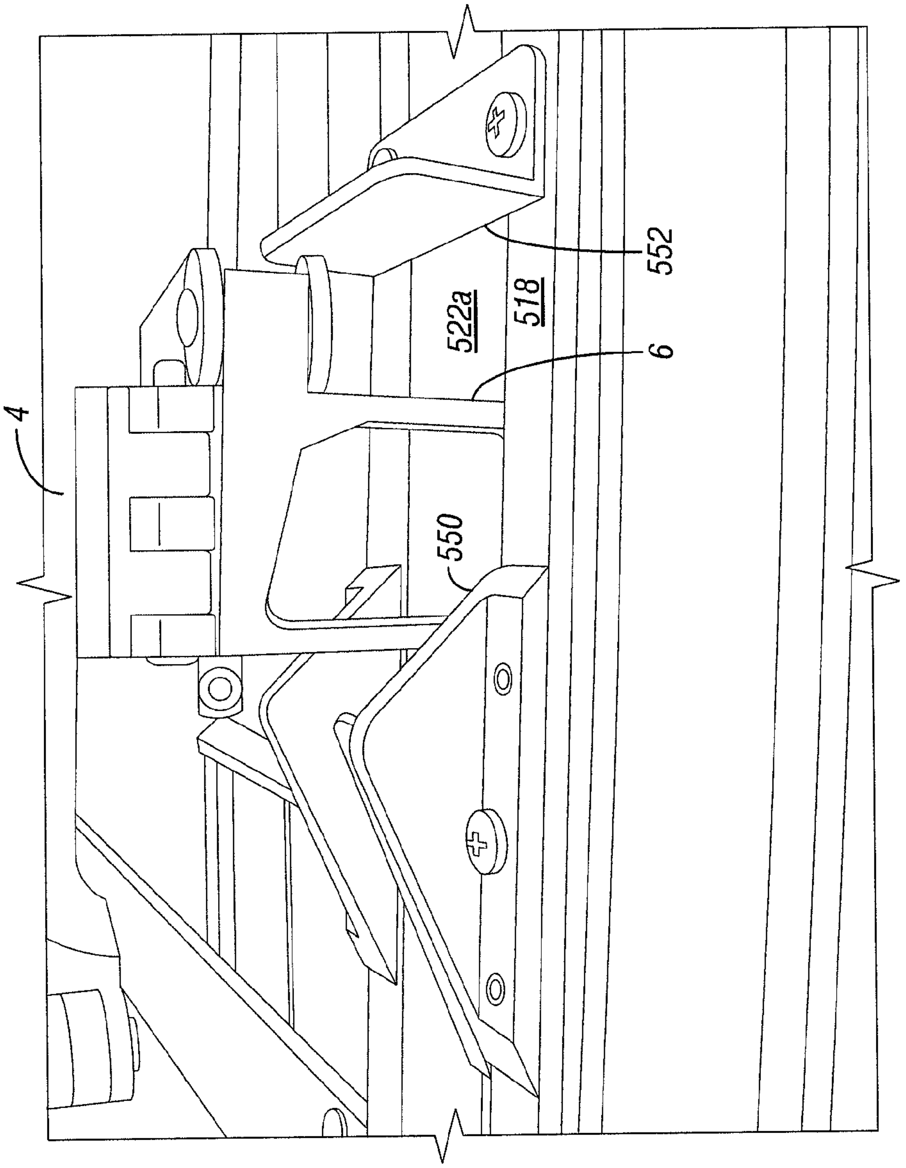
FIG. 11 is a detailed side view of the extension assembly of FIG. 10 engaging a stretcher.

The surface of the upper extension tracks 520*a*, 522*a* may include a coating of low-friction material to facilitate sliding a stretcher along the track surface. In one embodiment of the invention, the coating is a polymer material having a coefficient of sliding friction less than about 0.2. A ramp 550 is statically positioned within each upper extension track 520*a*, 522*a*. When a stretcher is placed onto the upper extension tracks 520*a*, 522*a* and slid into position, the front feet of the stretcher will slide over the ramps, which then act as stops, retaining the stretcher feet in place. As shown in FIG. 11, a stop bracket 552 may also be provided within each upper extension track 520*a*, 522*a* spaced apart from ramp 550 and positioned toward the head end 512. Ramp 550 and stop bracket 552 cooperate to secure the foot 6 of a stretcher 4 to prevent the stretcher 6 from sliding while being transported in the vehicle.

Referring again to FIG. 10, the foot-end cross member 526 acts as a track stop, to prevent the extension assembly 500 from moving outwardly from the tipping assembly 400, for example when the extension assembly 500 comes into contact with the ground.

The extension assembly may also include an assist handle 554 mounted to the foot-end cross member 526. The assist handle 554 may be configured to fold between the extension tracks 516, 518 for compact storage. The assist handle 554 is provided in the event of a failure in the electrical power system and/or spring tension system and provides a back-up means to manually lift and push and/or pull and lower the loading device 10 of the present disclosure.

Figure 12:
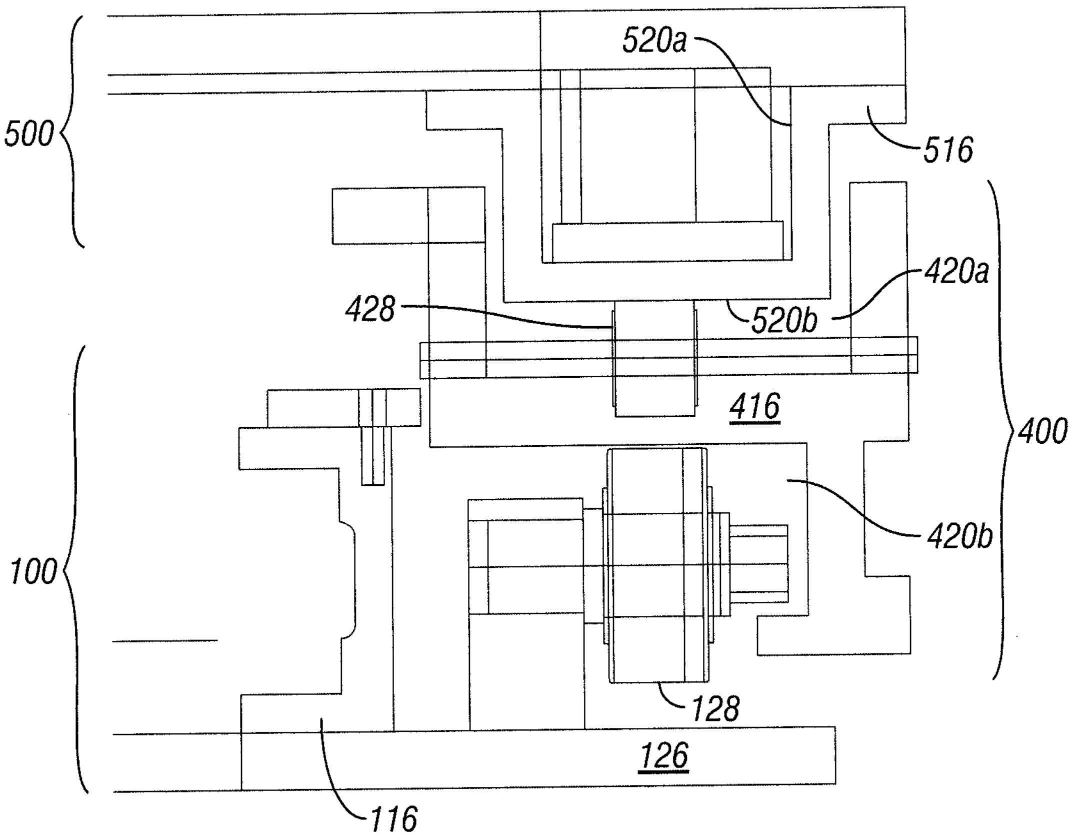
FIG. 12 is a sectional view of the loading device of FIG. 1 taken at line 12-12.

Referring to FIG. 12 the loading device 10 of the present disclosure is configured with tipping assembly 400 positioned on the base assembly 100, and the extension assembly 500 positioned on the tipping assembly 400. For clarity, FIG. 12 shows a section view of one side of the loading device, however, it should be understood that the opposite side is substantially a mirror-image of that shown. As shown in FIG. 12, the extension assembly 500 is positioned such that the lower extension track 520*b* rests on roller 428 mounted within the upper tipping track 420*a*. Lower tipping track 420*b* rests on roller 128 disposed on the outer side of base track 116. The extension assembly 500 is thereby permitted to move linearly relative to tipping assembly 400, which is permitted to move linearly relative to the base assembly 100.

Figures 13A, 13B, 13C:
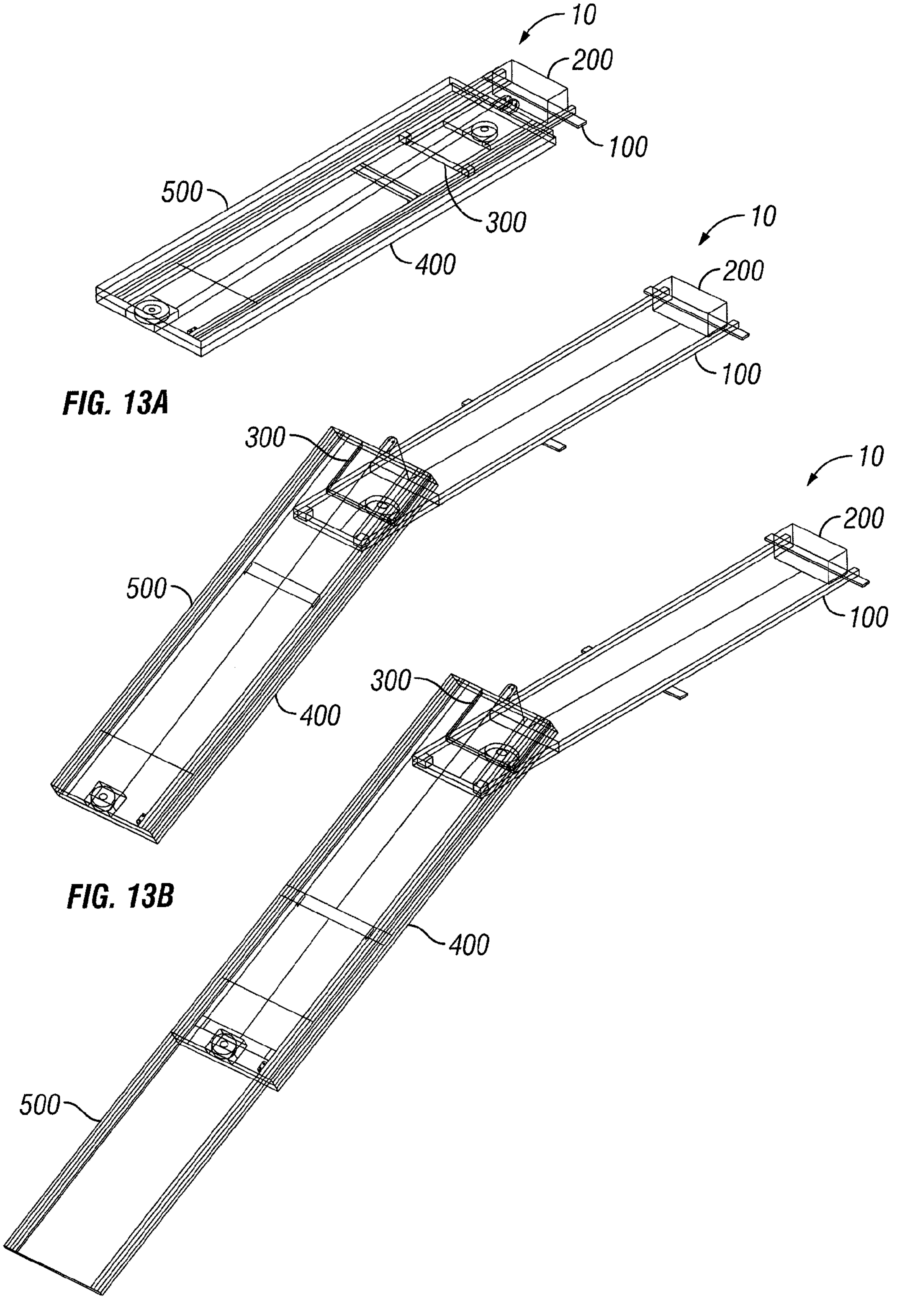

The loading device 10 of the present disclosure is configured for mounting in a vehicle 2, such as a patient compartment of an ambulance as shown in FIG. 15. Typically, the loading device 10 is mounted within the vehicle in a retracted position, as shown in FIG. 13A. A directional switch 230 is provided proximate to the vehicle door, allowing a user to operate the loading device 10 from either inside or outside the vehicle, as shown in FIG. 15.

Figure 14:
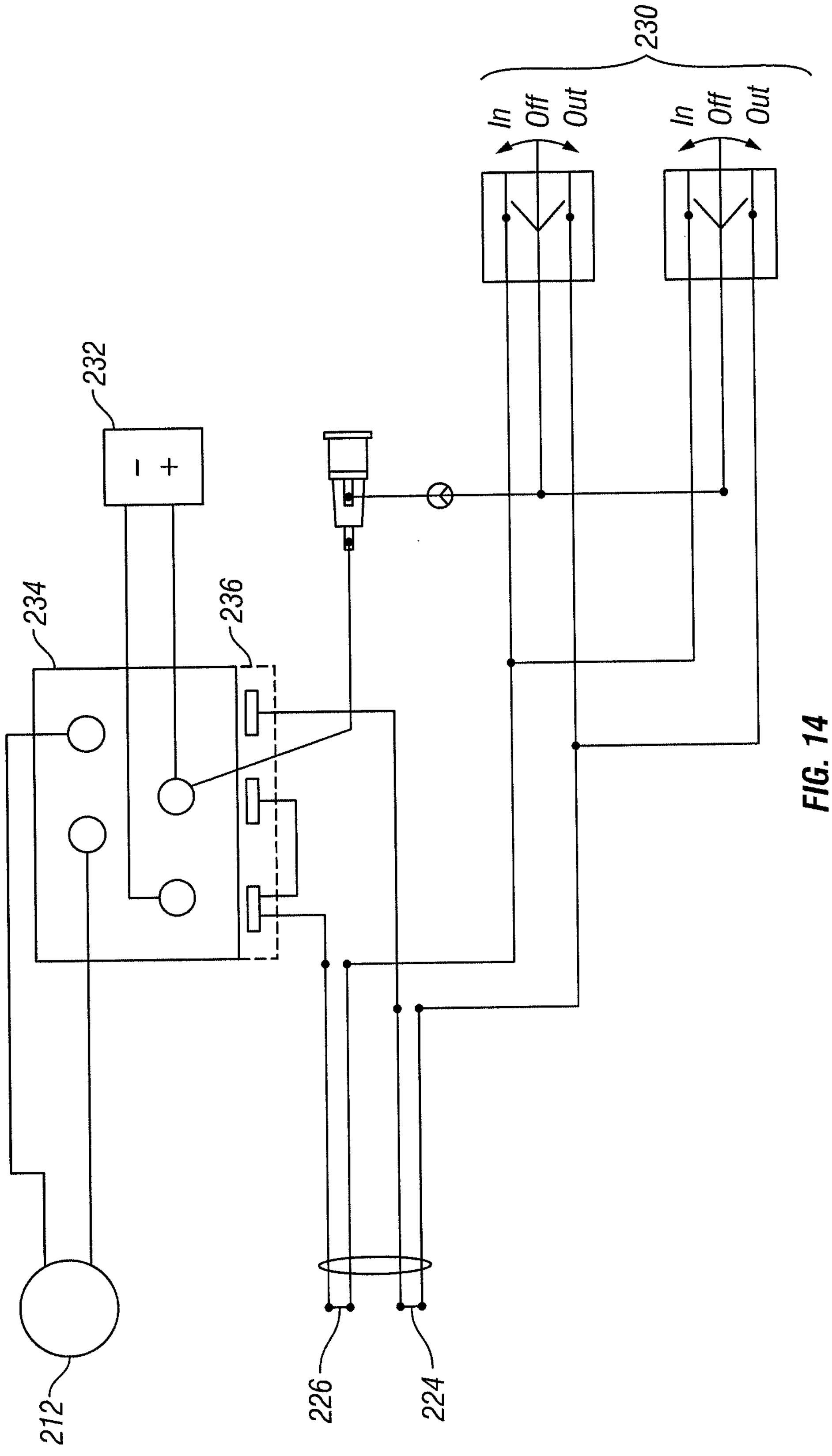
FIG. 14 is an electrical schematic of one embodiment of a control system for a loading and unloading device according to one embodiment of the present invention.

An exemplary embodiment of a control system for a loading device according to one embodiment of the present invention is shown in FIG. 14. Hoist motor 212 is connected to a power source 232, through a hoist controller 234. The power source 232 may include a 12 volt battery, a 24 volt battery, or other suitable device. The directional switch 230 has an "IN" position and an "OUT" position and is configured to energize a relay 236 that controls the polarity, and thereby controlling the direction, of the hoist motor 212. When the directional switch 230 is placed in the "OUT" position, the hoist assembly 200 unwinds the hoist cable 228. As the hoist cable 228 unwinds, the tension force of the trolley balancer 336 draws the trolley assembly 300 towards the foot end 114 of the base assembly 100. The trolley assembly 300 engages the tipping assembly 400, thereby also moving the tipping assembly towards the foot end 114 of the base assembly 100. The tension force of the extension balancer 436 draws the extension assembly 500 outwardly from the foot end 414 of the tipping assembly 400. The trolley balancer 336 and extension balancer 446 generate sufficient tension force to over come the spring force on the hoist mount 210, allowing the hoist mount 210 and hoist assembly 200 to tilt towards the head end 112, thereby disengaging the hoist pivot shut off switch 224 allowing the hoist motor 212 to operate.

When the tipping assembly 400 and the extension assembly 500 are fully extended and/or encounter a physical interference, such as the ground or other surface, the hoist cable 228 will become slack causing the hoist mount 210 to tilt towards the foot end 114. In this position, the hoist mount 210 engages the hoist pivot shut off switch 224, which activates relay 236 that disconnects the electrical power supply 234 from the hoist motor 212, thereby automatically shutting off the hoist motor 212.

When the stretcher 6 has been loaded onto the extension assembly 500 and secured, the directional switch 230 is placed into the "IN" position. This reverses the polarity of the hoist motor 212 winding the hoist cable onto the spool. The torque generated by the hoist motor 212 overcomes the tension generated by the trolley balancer 336 and extension balancers 436. The extension assembly 500, the tipping assembly 400, and the trolley assembly 300 are drawn toward the head end 112 of the base 100 by the hoist cable 228. When the trolley assembly 300 returns to its original retracted position, the trolley return shut off switch 226 is engaged, activating relay 236 which disconnects electrical power 234 to the hoist motor 212, thereby automatically shutting off the hoist motor 212. The hoist cable 228 holds the trolley assembly 300, the tipping assembly 400 and the extension assembly 500 in the parked position.

For manual operation of the loading device 10, the hoist cable 228 is disconnected from the extension assembly 500. The trolley balancing cable 344 is disconnected from connection 132 of the base assembly 100 and the extension balancing cable 444 is disconnected from connection 532 of the extension assembly 500. Disconnection of the hoist cable 228, the trolley balancing cable 344, and the extension balancing cable 444 removes the bias from the loading device 10. From the retracted configuration, a user is then able to grasp the assist handle 554, to manually pull the tipping assembly 400 and extension assembly 500 towards the foot end 14, relative to the base assembly 100, thereby placing the loading device in the extended configuration. Likewise, from the extended configuration, the user may grasp the assist handle 554 to lift and push the extension assembly 500 and the tipping assembly 400 towards the head end 12, relative to the base assembly 100, thereby placing the loading device in the retracted configuration.

While certain embodiments of the present invention are shown and described, it is envisioned that those skilled in the art may devise various modifications of the present invention without departing from the spirit and scope of the appended claims.

We claim:

1. A loading device for a vehicle, the loading device being operable between a retracted configuration and an extended configuration, the loading device comprising:
- a base assembly configured for mounting within the vehicle, the base assembly including:
  - a base frame having a head end and a foot end, and including a pair of base tracks, the base tracks being spaced apart and substantially parallel, each track including a rail disposed in an inner side of each base track and a roller disposed on an outer side of each track at the foot end;
- a hoist assembly pivotally mounted on the base frame, the hoist assembly including:
  - a hoist motor,
  - a gear box coupled to the hoist motor,
  - a cable spool coupled to the gear box, and
  - a hoist cable disposed about the cable spool and having a first end attached to the cable spool;
- a trolley assembly positioned on the base frame and configured to move linearly relative to the base frame, the trolley assembly including:
  - a trolley frame including a plurality of rollers mounted on the trolley frame and configured to cooperate with the rails of the base tracks,
  - a pair of load arms pivotally mounted on the trolley frame and
  - a trolley balancer assembly mounted to the load arms, the trolley balancer assembly including a trolley balancer cable having a first end attached to the trolley balancer assembly and a second end attached to the foot end of the base frame, the trolley balancer assembly being biased to move the trolley assembly toward the foot end of the base frame;
- a tipping assembly positioned on and configured to move linearly relative to the base assembly and configured to cooperate with the trolley assembly, the tipping assembly including:
  - a tipping frame having a head end and a foot end, and including a pair of tipping track assemblies, the tipping track assemblies being spaced apart and substantially parallel, each tipping track assembly includes an upper tipping track and a lower tipping track, wherein the trolley assembly cooperates with the tipping assembly to bias the tipping assembly to move towards the foot end of the base frame, and
  - an extension balancer assembly attached to the foot end of the tipping frame, the extension balancer assembly including an extension balancer cable having a first end attached to the extension balancer assembly; and
- an extension assembly positioned on the tipping assembly and configured to move linearly relative to the tipping assembly, the extension assembly including:
  - an extension frame having a head end and a foot end, and including a pair of extension track assemblies, the extension track assemblies being spaced apart and substantially parallel, each extension track assembly including an upper track and a lower track, the lower extension tracks configured to cooperate with upper tipping tracks,
  - a second end of the extension balancer cable attached to the foot end of the extension frame thereby biasing the extension assembly to move in the direction of the foot end of the tipping assembly, and
  - a second end of the hoist cable attached to the head end of the extension frame, wherein the bias of the trolley assembly, the tipping assembly and the extension assembly predisposes the loading device to the extended configuration, and wherein the hoist assembly is configured to wind the hoist cable about the cable spool, such that the hoist assembly is capable of overcoming the bias of the trolley assembly, the tipping assembly, and the extension assembly to place the loading device in the retracted configuration.

2. The loading device of claim 1, wherein the tipping assembly is configured to angle downwardly relative to the base assembly when the loading device is in the extended configuration.

3. The loading device of claim 1, wherein the hoist assembly further comprises a power source electrically connected to the hoist motor and a controller configured to control the direction of the hoist motor.

4. The loading device of claim 3, wherein the controller further comprises a directional switch having an "OUT" position and an "IN" position, wherein with the loading device in the retracted configuration, placing the switch in the "OUT" position causes the hoist motor to operate in a first direction causing slack in the hoist cable allowing the loading device to assume the extended configuration, and wherein with the loading device in the extended configuration, placing the switch in the "IN" position causes the hoist motor to rotate in a second direction, opposite the first direction, thereby winding the hoist cable about the cable spool overcoming the bias of the trolley balancer assembly and the extension balancer assembly and drawing the extension assembly, the tipping assembly, and the trolley assembly towards the head end of the base frame.

5. The loading device of claim 4 wherein the controller is configured to automatically shut off the hoist motor when the loading device is in the extended configuration.

6. The loading device of claim 4 wherein the controller is configured to automatically shut off the hoist motor when the loading device is in the retracted configuration.

7. A loading device for a vehicle, the loading device being operable between a retracted configuration and an extended configuration, the loading device comprising:

a base configured for mounting within the vehicle, the base having a head end and a foot end;

a tipping assembly positioned on the base and configured to travel linearly relative to the base and configured to be substantially aligned with the base when the loading device is in the retracted configuration and positioned at a first angle relative to the base when the loading device is in the extended configuration; and a trolley assembly, the trolley assembly positioned on the base and configured to move linearly relative to the base, wherein the trolley assembly is configured for cooperation with the tipping assembly, wherein the trolley assembly is biased to move in the direction of the foot end of the base and wherein the trolley assembly includes a load bar, the load bar being pivotally attached to the trolley assembly such that when the loading device is in the extended configuration, the load bar is biased to pivot upwardly and engage the tipping assembly, thereby orienting the tipping assembly at a second angle relative to the base.

8. The loading device of claim 7, further comprising an extension assembly positioned on the tipping assembly and configured to move linearly relative to the tipping assembly, wherein the extension assembly is biased to move in the direction of the foot end of the base.

9. The loading device of claim 7, wherein the tipping assembly is oriented at an angle downward relative to the base.

10. The loading device of claim 7, wherein the trolley assembly further comprises a retention cable attached to the load bar and configured to limit pivotal movement of the load bar.

11. The loading device of claim 7, further comprising a hoist assembly mounted on the base and an extension assembly, the hoist assembly including a hoist cable connected at a first end to the hoist assembly and connected at a second end to the extension assembly.

12. The loading device of claim 11, wherein the hoist assembly further comprises a controller including a directional switch having an "OUT" position to place the loading device in the extended configuration and an "IN" position to place the loading device in the retracted configuration.

13. The loading device of claim 12 wherein the hoist assembly further includes a hoist motor and the controller is configured to automatically shut off the hoist motor when the loading device is in the extended configuration.

14. The loading device of claim 12 wherein the hoist assembly further includes a hoist motor and the controller is configured to automatically shut off the hoist motor when the loading device is in the retracted configuration.

15. The loading device of claim 7, wherein the first and second angles are the same.

* * * * *